(12) United States Patent
Kageyama

(10) Patent No.: US 7,471,464 B2
(45) Date of Patent: Dec. 30, 2008

(54) LENS HOLDER AND LENS UNIT

(75) Inventor: Takuya Kageyama, Suwa (JP)

(73) Assignee: Nittoh Kogaku K.K., Nagano (JP)

( * ) Notice: Subject to any disclaimer, the term of this patent is extended or adjusted under 35 U.S.C. 154(b) by 131 days.

(21) Appl. No.: 11/489,280

(22) Filed: Jul. 19, 2006

(65) Prior Publication Data
US 2007/0024989 A1    Feb. 1, 2007

(30) Foreign Application Priority Data
Jul. 21, 2005    (JP)    ............... 2005-211569

(51) Int. Cl.
    *G02B 15/14*    (2006.01)
(52) U.S. Cl. ............... 359/699; 359/700; 359/702
(58) Field of Classification Search ......... 359/699–704; 396/529; 353/100, 101; 348/745
See application file for complete search history.

(56) References Cited

U.S. PATENT DOCUMENTS 4,466,709 A * 8/1984 Osawa ..................... 359/702
6,285,416 B1 * 9/2001 Mitchell et al. ............. 348/745
2006/0061888 A1    3/2006 Kageyama et al.
2006/0072218 A1    4/2006 Kageyama et al.

FOREIGN PATENT DOCUMENTS

JP        08-327872        12/1996

* cited by examiner

*Primary Examiner*—Joseph Martinez
(74) *Attorney, Agent, or Firm*—Thompson Hine LLP

(57)    ABSTRACT

A lens holder includes an inner barrel for holding at least one lens, an outer barrel that is positioned outside the inner barrel and supports the inner barrel so that the inner barrel linearly slides along a central axis thereof across an inner surface of the outer barrel, and a cam barrel that rotates in a state where the cam barrel is coaxially disposed between the inner barrel and the outer barrel. The cam barrel includes at least two subunits of the same shape produced by dividing the cam barrel on a plane that includes the central axis, an operating part that passes through an operating slit provided on the outer barrel and moves at least one of the subunits to rotate the cam barrel, a helical cam mechanism that slides, via a driven part provided on the inner barrel, the inner barrel forward and backward along the central axis when the cam barrel rotates, and a locking mechanism for pulling at least one of the subunits onto the outer barrel to stop rotation of the cam barrel.

17 Claims, 6 Drawing Sheets

LENS HOLDER AND LENS UNIT

CROSS-REFERENCE TO RELATED APPLICATION

This application is based upon and claims the benefit of priority from the prior Japanese Patent Application No. 2005-211569, filed Jul. 21, 2005, the entire contents of which are incorporated herein by reference.

TECHNICAL FIELD

The present invention relates to a lens holder and a lens unit suited to an image displaying apparatus that magnifies and projects an image, which is formed on a light modulator such as a liquid crystal display apparatus or a DMD, onto a screen.

BACKGROUND

Rear projection apparatuses (hereinafter rear projector) where projected light from a light modulator, which forms an image by modulating light based on an image signal, is projected by a projection lens onto a screen from behind the screen are conventionally known.

A lens apparatus equipped with a moving lens unit is disclosed by Japanese Laid-Open Patent Publication No. H08-327872. This lens apparatus includes a lens barrel that has a plurality of cam grooves provided on an outer circumferential surface thereof in parallel with a central axis direction, a cam ring that is disposed in the lens barrel and includes a plurality of cam grooves provided so as to intersect the central axis of the lens barrel at an angle, a movable lens unit disposed inside the cam ring, a plurality of cam pins disposed on an outer circumferential surface of the movable lens unit, and a cam pin holding frame that is linked to the outer circumferential surface of the movable lens unit and supports the cam pins. This lens apparatus is constructed so that the cam pins and the cam pin holding frame are provided with through-holes that integrally pass through the cam pins and the cam pin support frame, and by screwing adjustment screws that contact the outer circumference of the movable lens unit into the through holes, the outer circumference of the movable lens unit is pushed from outside by the adjustment screws.

Rear projector magnify and project images formed by a light modulator (also referred to as a "light valve" or an "image forming apparatus") such as a liquid crystal display apparatus or a DMD (digital mirror device) onto a screen from behind the screen using a lens unit (i.e., a projection lens). Rear projector can produce a large image in spite of having a slim form, and are subject to attention as next-generation image displaying apparatuses. Since the positional relationship between the light valve and the screen is fixed, the focus of the lens unit should preferably be fixed.

In a lens unit equipped with a plurality of lenses, even if a fixed focus-type unit, the individual lenses that compose the lens unit and the lens holder (or "lens holding unit") that holds such lenses includes manufacturing tolerances. Accordingly, it is necessary to finely adjust the relative positions of the lenses on the optical axis. In addition to the differences between individual lens units, there are differences between individual rear projectors. Accordingly, there is demand for a design where the focus can be finely adjusted when incorporating a lens unit into a rear projector.

On the other hand, since the projection lens unit of a rear projector magnifies and projects an image formed by a light modulator, even a minute deviation in the focus may cause deterioration in the quality of the image formed on the screen. In particular, it is hoped that rear projectors will be able to replace displays where a light valve is directly viewed, such as cathode ray tubes, liquid crystal display apparatuses, and plasma displays. Accordingly, the images projected onto the screen of a rear projector are required to be as sharp as the images on a conventional display that is viewed directly. Also, after the lens unit has been installed in a rear projector with the focus and other conditions having been finely adjusted, it is preferable to prevent occurring deviation in the focus due to an external shock applied to the apparatus during shipping from the factory, during delivery to the user, or the like.

SUMMARY

According to an aspect of the present invention, a lens holder is provided. The lens holder includes an inner barrel for holding a lens or lenses, an outer barrel that is positioned outside the inner barrel and supports the inner barrel so that the inner barrel linearly slides along a central axis across an inner surface of the outer barrel, and a cam barrel that rotates in a state where the cam barrel is coaxially disposed between the inner barrel and the outer barrel. A driven part (passive part) is provided on the inner barrel. An operating slit is provided on the outer barrel. The cam barrel includes at least two subunits of the same shape produced by dividing the cam barrel on a plane that includes the central axis, an operating part that passes through the operating slit provided on the outer barrel and moves at least one of the subunits to rotate the cam barrel, a helical cam mechanism that slides, via the driven part provided on the inner barrel, the inner barrel forward or backward along the central axis when the cam barrel rotates, and a locking mechanism for pulling at least one of the subunits onto the outer barrel to stop rotation of the cam barrel.

With a system where a lens supporting frame moves relative to a base frame using a cam ring to adjust the focus, movement of the lens supporting frame due to a shock can be easily prevented by fixing a rotational position of the cam ring relative to the base frame after the focus has been adjusted. However, to fix the cam ring to the base frame, it is possible to have a fixing screw pull or push the cam ring in the radial direction. If the cam ring is pulled or pushed in the radial direction for fixing by screws, stress will be applied to the lens supporting frame and/or the base frame, which can cause deviation in the optical axis that has been finely adjusted before shipping. It may be possible to solve this problem by not using a ring-shaped cam. However, if the cam is not ring-shaped, it will not be possible to rotate the cam when the cam has been incorporated into the lens holder.

In this aspect of the lens holder of the present invention, the cam barrel is coaxially arranged between the inner barrel and the outer barrel and can be rotated. The inner barrel is supported by the outer barrel so as to linearly slide along the central axis across the inner surface of the outer barrel by the cam barrel. Accordingly, the cam barrel is constructed by being divided into at least two subunits on a plane that includes the central axis and the cam barrel itself is not truly ring-shaped, it is possible to incorporate the cam barrel into the lens holder. It is possible to cause the cam barrel to rotate using the operating part via the operating slit provided on the outer barrel. Since the inner barrel can be slid forward and backward along the central axis via the driven part provided on the inner barrel using the helical cam mechanism, it is possible to adjust the focus. In addition, since the cam barrel is divided into subunits, when rotation of the cam barrel is prevented by pulling at least one of the subunits onto the outer barrel using the locking mechanism after the focus has been adjusted, applying stress to the inner barrel and the outer barrel can be reduced or prevented. Accordingly, after the focus has been adjusted, the rotational position of the cam barrel can be fixed to prevent deviation in the focus due to external shocks, in addition, when fixing, it is possible to prevent deviation in other conditions, such as the optical axis of the lens system that have been adjusted, being caused by stress acting on the inner barrel.

One of aspects of the helical cam mechanism of the lens holder includes a guide that is helically shaped around the central axis and contacts the driven part, which extends outward from the inner barrel, from in front and behind. In this case, when the cam barrel is rotated from outside the outer barrel, the helically shaped guide causes the inner barrel to slide forward and backward along the central axis via the driven part provided on the inner barrel, without the cam barrel itself moving forward and backward.

In one of other aspects of the lens holder, the outer barrel is equipped with a helically shaped slit that is formed around the central axis, and the helical cam mechanism includes a protruding guided part that moves inside the helically shaped slit and a guide that is arranged in a circumferential direction so as to contact or engage the driven part, which extends outward from the inner barrel, from in front and behind. In this case, when the cam barrel is rotated from outside the outer barrel, the protruding guided part is driven inside the helically shaped slit, so that the cam barrel moves forward and backward, and since the driven part that extends outward from the inner barrel contacts or engages the guide from in front and/or behind, the inner barrel slides forward and backward.

The helically shaped slit may also serve as the operating slit. The protruding guided part may also serve as the operating part. The protruding guided part may also serve as the locking mechanism. In such case, the locking mechanism should preferably be capable of locking by a screw member screwed thereinto.

The operating part can serve as the locking mechanism. In such case, the operating parts should preferably be capable of locking by a screw member screwed thereinto.

The inner barrel, the outer barrel, and the cam barrel should preferably be molded from resin. By integrally molding the driven part and the inner barrel, unintentional disengaging between the driven part and the cam barrel can be prevented even if a shock is applied to the inner barrel along the central axis (i.e., in the "optical axis direction" or "thrust direction").

As the cam barrel, a so-called "clamshell-type structure" including two subunits of the same shape produced by dividing a cylindrical member along a central axis and centered on the central axis may be used. Also, as the outer barrel and the inner barrel, structures that are divided into at least two parts on a plane that includes the central axis may be used. More preferably, the outer barrel and the inner barrel may also be clamshell-type structures that are divided into two parts on a plane that includes the central axis.

Since the clamshell-type holder is produced by joining two subunits manufactured from a single mold, the lens holder can be manufactured and assembled at low cost. Also, since the holder is produced by assembling the subunits with the same configuration and the same manufacturing tolerances to the radial direction, it is easy to align the centers or optical axes of lenses. Accordingly, the clamshell-type holder is suitable for the lens unit of a rear projector.

One of other aspects of the present invention is a lens unit including the lens holder described above and at least one lens held by the inner barrel. The focus of this lens unit is finely adjustable and, adjusted focus is highly resistant to shocks, and other optical characteristics of the lens unit can also be kept stable.

Further one of other aspects of the present invention is an image displaying apparatus including the lens unit described above, a light modulator that forms an image to be projected via the lens unit onto a screen, and the screen. According to this image displaying apparatus it is possible to stably project sharp images onto a screen.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE DRAWINGS

The accompanying drawings, which are incorporated fin and constitute a part of the specification, illustrate embodiments of the invention, and together with the general description given above and the detailed description of the embodiments given below, serve to explain the principles of the invention.

DETAILED DESCRIPTION

Figure 1:
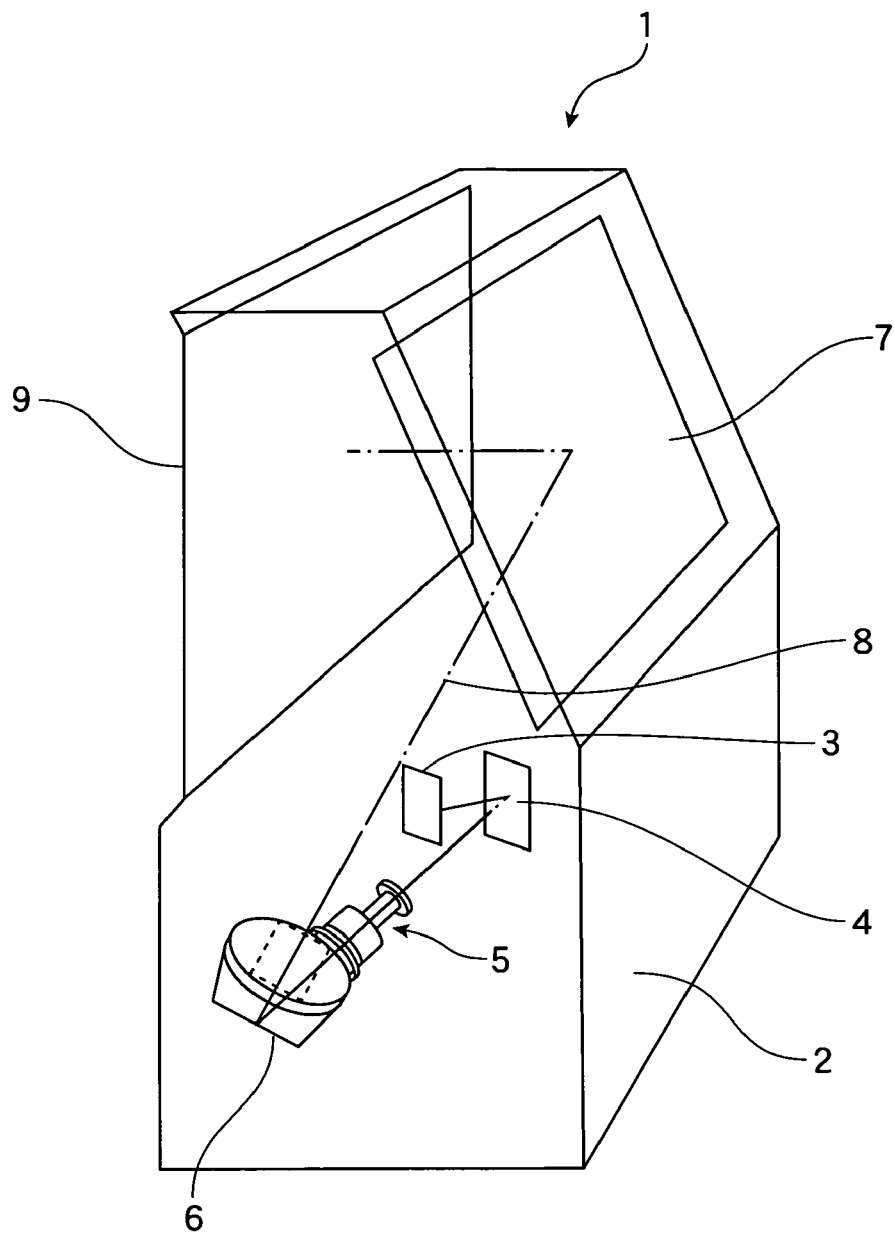
FIG. 1 is a view showing the overall construction of a rear projector.

FIG. 1 shows the overall construction of a rear projector 1 as an image displaying apparatus. The rear projector 1 includes, inside a housing 2, a light source 3, a light modulator (light valve) 4 that modulates light from the light source 3 according to an image signal to form images, a lens system 5 for magnifying and projecting the images formed on the light valve 4, and a mirror 7 for reflecting projecting light 8 to a screen 9. The screen 9 is disposed on the front surface of the housing 2, and images on the light valve 4 are magnified and projected via the lens system 5 onto the screen 9 from behind the screen 9. A liquid crystal display panel and a DMD (digital mirror device) panel composed of micromirror elements are applicable for the light valve 4.

Figure 2:
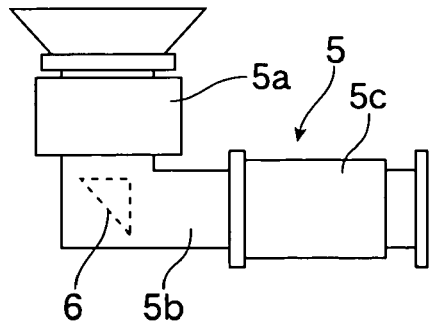
FIG. 2 is a view showing a lens system of the rear projector.

FIG. 2 shows the overall construction of the lens system 5 for projecting images. The lens system 5 is constructed by connecting a number of lens units. In this example, the lens system 5 is constructed of a lens unit 5a on the output side (the magnifying side), a lens unit 5b inside which a prism 6 for bending the optical path is provided, and a lens unit 5c on the input side. The lens system 5 has an overall L-shape. Inside the lens system 5, light is bent by 90° by the prism 6 and outputted as the projecting light 8. The projecting light 8 is projected onto the screen 9 via the mirror 7 of the rear projector apparatus 1 to form images.

Figure 3:
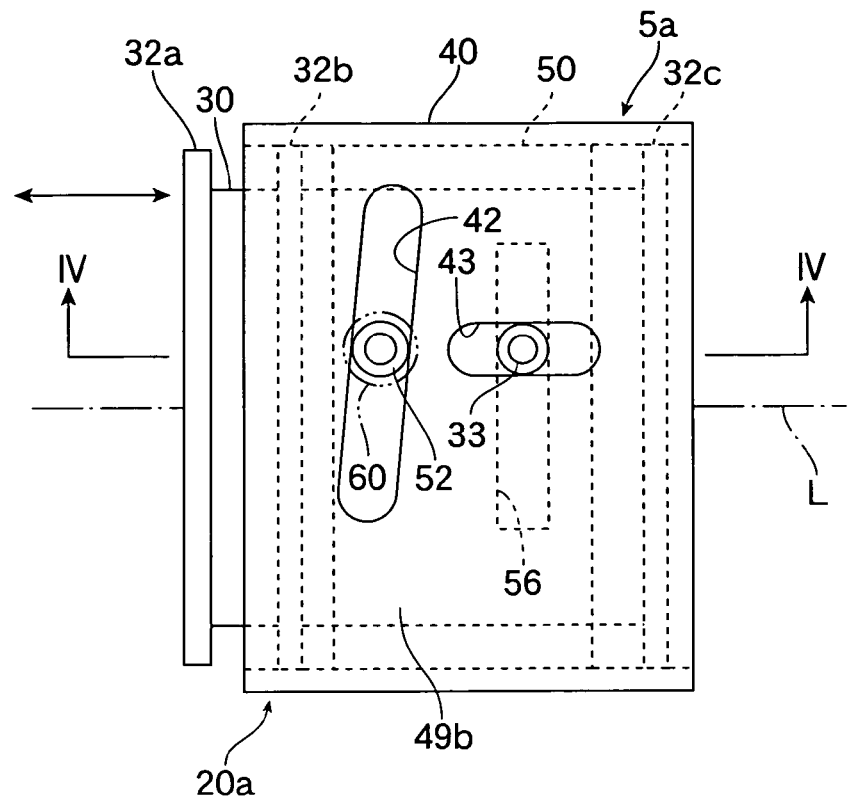
FIG. 3 is a side view of the lens unit for constructing the lens system.
Figure 4:
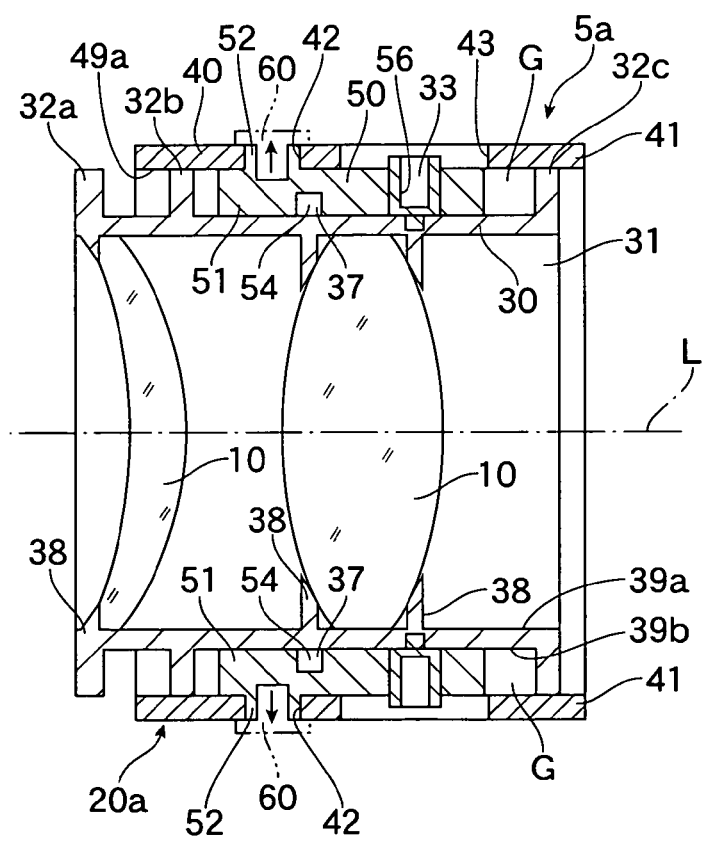
FIG. 4 is a cross-sectional view of the lens unit shown in FIG. 3.

FIG. 3 is a side view of the lens unit 5a. FIG. 4 is a cross-sectional view of the lens unit 5a. The lens unit 5a includes a lens holder 20a and at least one lens 10 (in this example, two lenses 10) held by the lens holder 20a.

Figure 5:
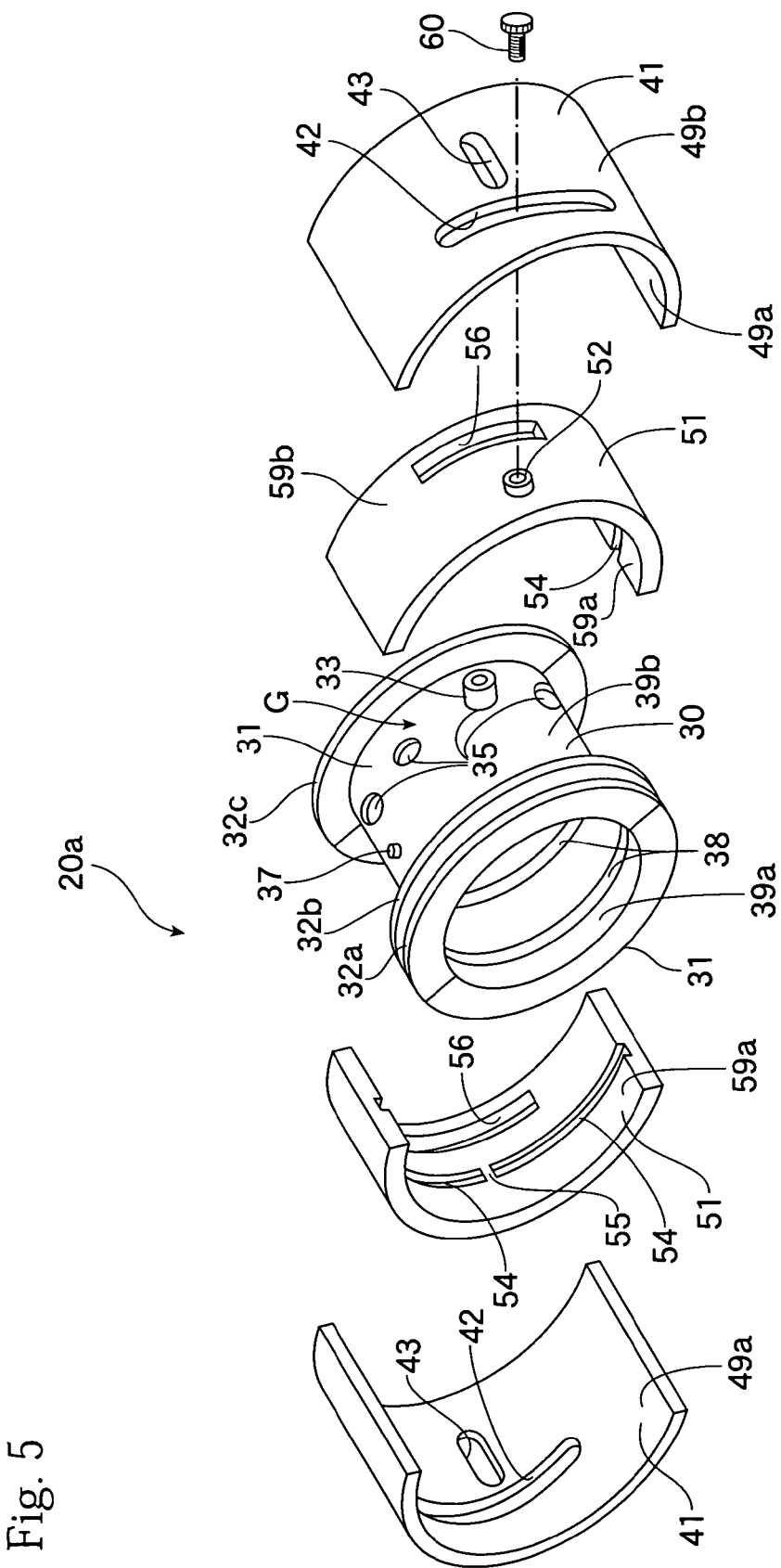
FIG. 5 is an exploded perspective view of the lens holder of the lens unit shown in FIG. 3.

FIG. 5 is an exploded perspective view of the lens holder 20a. The lens holder 20a includes an inner barrel (a cylindrical inner shell, inner shell) 30 that is substantially cylindrical and holds the lenses 10, an outer barrel (a cylindrical outer shell, outer shell) 40 that is disposed on the outside of the inner barrel 30 and supports the inner barrel 30 so that the inner barrel 30 can slide across an inner surface 49a of the outer barrel 40 in a straight line along the central axis L of the inner barrel 30, and a cam barrel (a cylindrical cam shell, cam shell) 50 that rotates in a state where the cam barrel 50 is coaxially disposed between the inner barrel 30 and the outer barrel 40. The inner barrel 30, the outer barrel 40, and the cam barrel 50 are all clamshell-type holders and the respective subunits 31, 41, and 51 thereof are molded from resin. That is, the barrels 30, 40, and 50 respectively include the clamshell-type subunits 31, 41, and 51 that are each divided into left and right or upper and lower halves on a plane that includes the central axis L of the inner barrel 30 which substantially matches the optical axis of the lens unit 5a. The subunits 31 of the inner barrel 30 and the subunits 41 of the outer barrel 40 are respectively joined together by bolts or the like to form respective barrels (shells) that are substantially cylindrical. On the other hand, for the cam barrel 50, the two subunits 51 of the same shape are coaxially incorporated between the inner barrel 30 and the outer barrel 40 without being joined together, such subunits 51 rotating together to function as the cam barrel 50 but in mechanical and structural terms, the individual subunits 51 being independent.

The barrels 30, 40, and 50 may be respectively constructed of three or more subunits. However, in view of the ease of assembling the lens holder 20a and the ease of molding resin (plastic), and the like, it is preferable to use two identical subunits produced by dividing or separating the barrels 30, 40 and 50 in two parts along the central axis L and centered on the central axis L as the barrels 30, 40 and 50.

Figure 6:
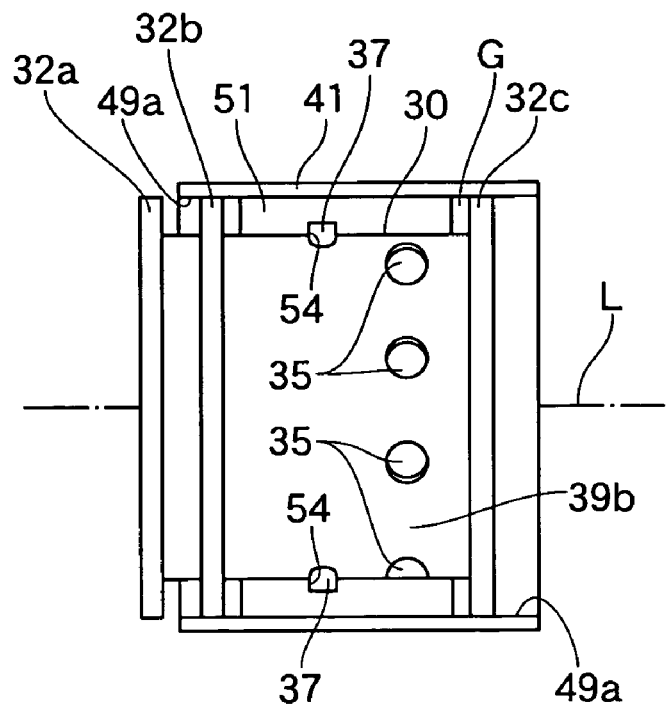
FIG. 6 is a side view of the lens holder shown in FIG. 5 in a state where one of subunits constructing the cam barrel and one of subunits constructing the outer barrel have been removed.
Figure 7:
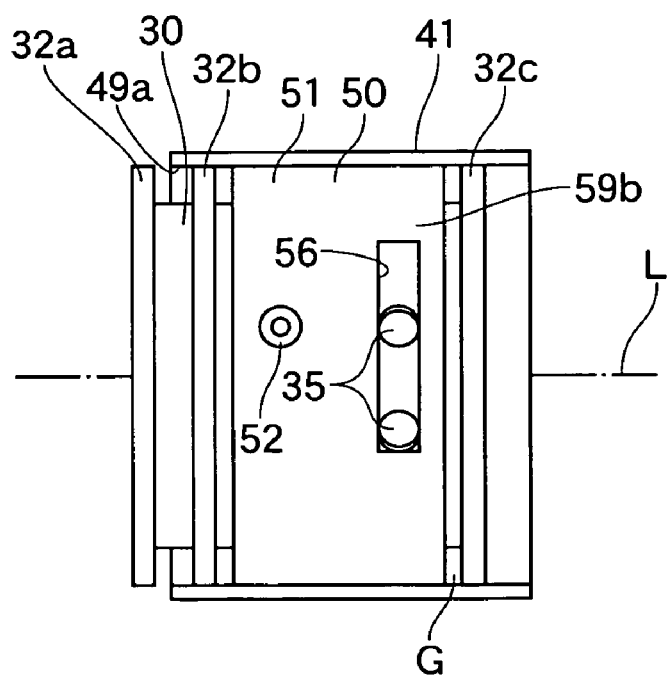
FIG. 7 is a side view of the lens holder shown in FIG. 5 in a state where one of the subunits constructing the outer barrel has been removed.

FIG. 6 shows the lens holder 20a in a state where one of the subunits 41 of the outer barrel 40 and one of the subunits 51 of the cam barrel 50 have been removed. FIG. 7 shows the lens holder 20a in a state where one of the subunits 41 of the outer barrel 40 has been removed.

The inner barrel 30 is equipped with a number of structures for holding the lenses 10 on an inner circumferential surface 39a thereof. As one example, three protrusions 38 are provided so as to protrude inward around the circumference of the inner barrel 30. The inner barrel 30 also includes a first flange 32a, a second flange 32b, and a third flange 32c provided on an outer circumferential surface 39b thereof so as to protrude outward around the circumference. The first flange 32a is arranged outside the outer barrel 40 and is connected to another lens unit. The second flange 32b and the third flange 32c contact the inner surface 49a of the outer barrel 40. Accordingly, the inner barrel 30 is supported on the outer barrel 40 so as to slide along the central axis L across the inner surface 49a of the outer barrel 40.

A gap G is produced between the inner barrel 30 and the outer barrel 40 between the second flange 32b and the third flange 32c. The cam barrel 50 is disposed inside this gap G. Two driven parts (passive parts) 37 that protrude outward are provided on the outer circumferential surface 39b of the inner barrel 30. The inner barrel 30 is driven along the central axis L (forward and backward) by the cam barrel 50.

As shown in FIGS. 3 to 5, the cam barrel 50 includes functions of a helical cam. In this example, the cam barrel 50 moves forward and backward and is guided by a slit 42 that is formed in the outer barrel 40 and helically shaped around the central axis L. Accordingly, when the cam barrel 50 is rotated, the inner barrel 30 is caused to slide forward or backward along the central axis L via the two driven parts 37 that protrude outward from the inner barrel 30.

More specifically, protruding guided parts 52 are provided on the outer circumferential surfaces 59b of the respective subunits 51 of the cam barrel 50. Helical slits 42 are provided in the subunits 41 of the outer barrel 40. The protruding guided parts 52 move inside the corresponding helical slits 42. The driven parts 37 that extend outward are also provided on the respective subunits 31. Guide grooves 54 that extend around the circumference are formed on the inner circumferential surfaces 59a of the subunits 51 of the cam barrel 50 so as to contact (engage) the driven parts 37 from in front and behind. Bridge parts 55 are provided in central parts of the guide grooves 54.

In addition, with the configuration described above, the inner barrel 30 can rotate within a range of 180° around the central axis L with respect to the cam barrel 50. This means that even after the lens unit 5a, including the cam barrel 50, has been assembled, so long as a head piece, described later, has not yet been attached, the optical axis of the lens system can be adjusted by rotating the inner barrel 30 around the central axis L relative to the outer barrel 40.

Note that the driven parts 37 of the inner barrel 30 are not limited to protruding parts that extend outward from the outer circumferential surface 39b of the inner barrel 30. Guide grooves may be provided on the inner barrel 30 as driven parts. In such case, protruding engaging parts that extend toward the inner barrel 30 from the inner surface 59a may be provided on the subunits 51 of the cam barrel 50.

When the subunits 51 have been assembled, the respective protruding guided parts 52 of the cam barrel 50 include a function of locking mechanism for stopping the cam barrel 50 from rotating by pulled and caught on the subunits 41 of the outer barrel 40 that are respectively faced to the subunits 51, and a function of operating parts for operating the cam barrel 50 from outside the outer barrel 40. That is, the helical slits (helically shaped slits) 42 that are provided on the subunits 41 of the outer barrel 40 and are used by the cam mechanism also serve as the operating slits. That is the protruding guided parts 52 are set by being passed through the corresponding slits 42. And the protruding guided parts 52 can be seen from the outer surface 49b of the outer barrel 40 so as to serve as operating parts.

The protruding guided parts (operating parts) 52 of the cam barrel 50 are formed as bosses. As shown in FIGS. 3 and 5, after the operating parts 52 have been operated to cause the cam barrel 50 to rotate and thereby move the inner barrel 30 forward and/or backward to finely adjust the focus, fixing screws 60 are screwed into the operating parts 52 to pull the subunits 51 into tight contact with the outer barrel 40, thereby stopping or locking rotation of the cam barrel 50. In place of the screw members 60, operating levers with screw threads in the front ends thereof can be screwed into the operating parts 52. Such operating levers can be used when finely adjusting the focus.

In addition to the slits 42 that are used to operate the cam barrel 50 and also function as guides for the helical cam, slits 43 that are parallel to the central axis L are provided on the outer barrel 40 to cause the inner barrel 30 to move along the central axis L with respect to the outer barrel 40. Slits 56 that extend across the circumferential surface in the direction perpendicular to the central axis L are also provided in the subunits 51 of the cam barrel 50. Head pieces 33 that have been attached or fixed to the outer circumferential surfaces 39b of the inner barrel 30 pass through the slits 56 and are moved in the slits 43 on the outer barrel 40 along the central axis L by.

Accordingly, even if the cam barrel 50 is operated so as to rotate, the inner barrel 30 will not rotate. The flanges 32b and 32c of the inner barrel 30 contact the inner surface 49a of the outer barrel 40, thereby preventing the inner barrel 30 from rattling. Due to the combination of the pieces 33 and the slits 43, the inner barrel 30 slides in a straight line along the central axis L without rotating relative to the outer barrel 40. This means that even if the lens system 5 is incorporated into the rear projector 1 after fine adjustments such as adjustment of the optical axis have been completed during assembly of the lens system 5, it is possible to further adjust the focus of the lens system 5 in a state where the optical axis is aligned without axis deviation.

The optical axis can be adjusted at the time when the pieces 33 are attached to the outer circumferential surface 39b of the inner barrel 30. That is, between the second flange 32b and the third flange 32c, a plurality of holes 35 are provided around the circumference at predetermined intervals on the outer circumferential surface 39b of the inner barrel 30. The pieces 33 can be set or inserted in any of the plurality of holes 35 provided on the inner barrel 30. Accordingly, in the assembling process of the lens unit 5a or the lens system 5, after the lenses 10 have been set in the inner barrel 30, the inner barrel 30 can be rotated relative to the outer barrel 40 to adjust the optical axis, then the pieces 33 can be set in the suitable holes 35 through the slits 43 of the outer barrel 40 and the slits 56 of the cam barrel 50 from outside the outer barrel 40. After this, the inner barrel 30 is prevented from rotating relative to the outer barrel 40 by the pieces 33 and the slits 43 of the outer barrel 40. Therefore, by adjusting the optical axis in a factory before shipping, favorable optical characteristics can be maintained thereafter.

In the lens system 5 assembled using the lens unit 5a including the lens holder 20a, fine adjustment of the focus is carried out as follows. First, using the operating parts 52, the cam barrel 50 is rotated via the operating slits 42 provided on the outer barrel 40. By doing so, the protruding guided parts 52 that also serve as the operating parts move while being guided by the helical slits 42 of the outer barrel 40 that also serve as operating slits. The cam barrel 50 functions as a helical cam that converts the rotational operation to forward or backward movement along the central axis L, then the movement is transmitted to the inner barrel 30 via the driven parts 37 provided in the inner barrel 30. The inner barrel 30 slides forward or backward relative to the outer barrel 40 along the central axis L. During the movement, the inner barrel 30 does not rotate relative to the outer barrel 40, as described. This means it is possible to adjust the focus easily without causing deviation in the optical axis.

After adjusting the focus, as shown in FIGS. 3 and 5, by screwing the screwing members 60 into the protruding guided parts 52 that also serve as the locking mechanism, the subunits 51 of the cam barrel 50 are pulled onto the outer barrel 40 to stop rotation of the cam barrel 50. Although the subunits 51 of the cam barrel 50 move as a barrel during a rotation operation, the subunits 51 that are fitted into the gap G between the outer barrel 40 and the inner barrel 30, are not mechanically connected to each other. Accordingly, even if the subunits 51 are pulled onto and fixed to the outer barrel 40, no stress is applied to the inner barrel 30. Accordingly, it is possible to fix the rotational position of the cam barrel 50 while avoiding displacement of the inner barrel 30 due to the cam barrel 50 contacting for push and/or pull the inner barrel 30 after the focus has been adjusted and avoiding deviation of the optical axis of the lens system due to such displacement. Since the guide surfaces of the helical cam mechanism are inclined in both the central axis direction (the thrust direction) and the radial direction, even if the lens unit 5a receives a shock in various directions, the inner barrel 30 is not susceptible to moving relative to the cam barrel 50. Accordingly, after the focus has been finely adjusted and the lens system 5 has been incorporated into the rear projector 1, it is possible to prevent focal deviation and therefore stably project sharp images onto the screen.

Figure 8:
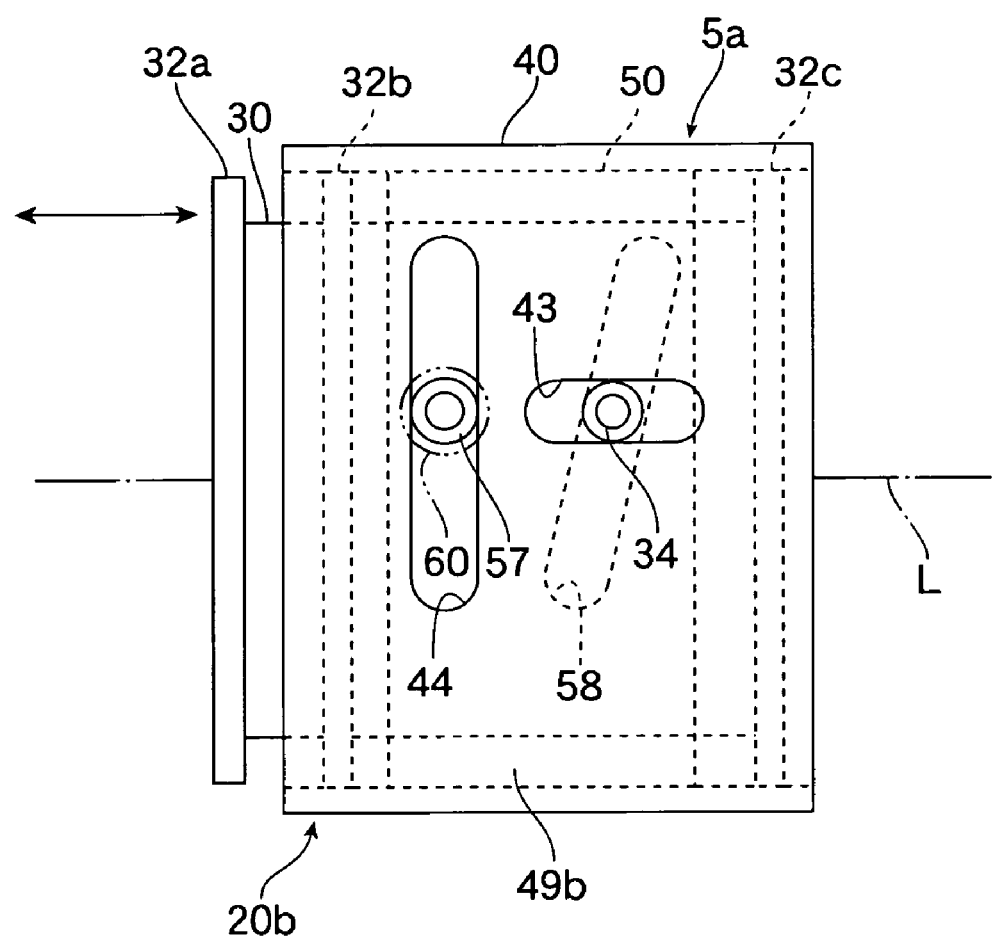
FIG. 8 is a side view of a lens unit according to another embodiment of the present invention.
Figure 9:
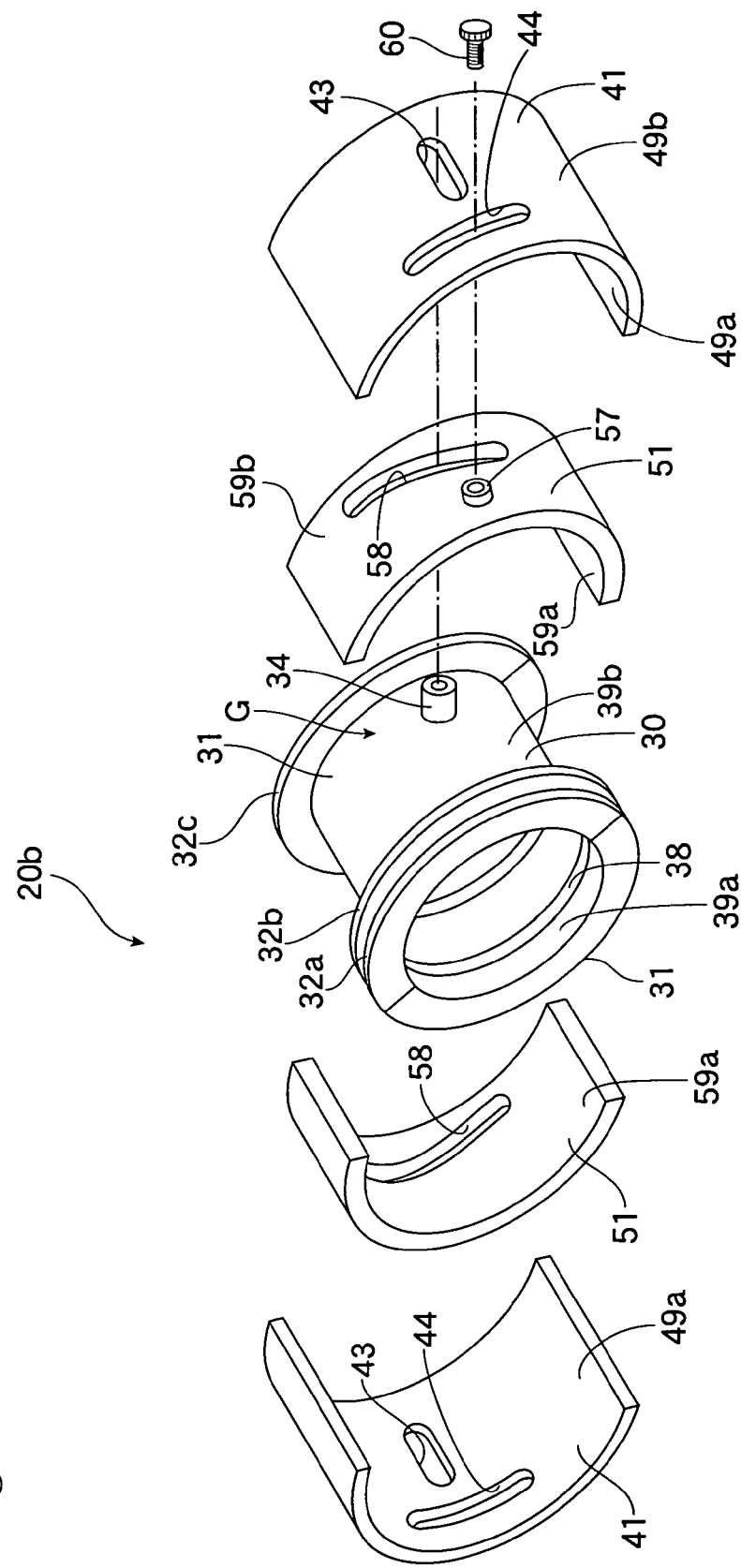
FIG. 9 is an exploded perspective view of the lens holder shown in FIG. 8.

FIG. 8 shows a different example of the lens unit 5a. FIG. 9 is an exploded perspective view of a lens holder 20b of the lens unit 5a. Although the lens holder 20a described above is configured so that the cam barrel 50 moves forward and backward with respect to the outer barrel 40, the lens holder 20b is configured so that the cam barrel 50 does not move forward and backward with respect to the outer barrel 40 and only the inner barrel 30 moves forward and backward with respect to the cam barrel 50 when the cam barrel 50 rotates. For the arrangement and the parts of this case that is substantially the same as that of the described above, the same reference numerals have been assigned and relating description has been omitted.

The cam barrel 50 is equipped with an operating part 57 that moves through an operating slit 44 provided on the outer barrel 40 to rotate one of the subunits 51 with the other, a helical cam mechanism for sliding the inner barrel 30 forward and backward along the central axis L via driven parts 34 provided on the inner barrel 30 when the cam barrel 50 rotates, and a locking mechanism for pulling the subunits 51 onto the outer barrel 40 to stop the cam barrel 50 from rotating.

In this lens holder 20b, the operating parts 57 also serve as the locking mechanism and are capable of locking by the screw members 60 screwed thereinto. The helical cam mechanism includes slits 58 that contact or engage the driven parts 34, which extent outward from the inner barrel 30, from in front and behind, being helically shaped around the central axis L so as to move the inner barrel 30 forward and backward via the driven parts 34. The driven parts 34 pass through the cam barrel 50 and are located in the slits 43, and the slits 43 linearly extends in the front-rear direction of the outer barrel 40 so as to serve as guides for linearly moving the inner barrel 30 without the inner barrel 30 rotating relative to the outer barrel 40.

Accordingly, in the lens unit 5a that uses the lens holder 20b, like the lens unit described above, it is possible to adjust the optical axis. Also, by attaching screws to the operating parts 57 that protrude from the subunits 51 of the cam barrel 50 after further adjusting the focus, it is becomes possible that such focus adjusting can be made in a state where the optical axis has been aligned and without causing deviation to the optical axis aligned.

Note that in the example described above, since clamshell-type barrels where the same parts (i.e., subunits) are assembled are applied for constructing the inner barrel 30, the outer barrel 40, and the cam barrel 50, therefore, the subunits 31, 41, and 51 that construct the respective barrels can have the same constructions respectively. In the above examples, since slits 42 and 43 are respectively provided in both subunits 41 of the outer barrel 40 of the holding unit 20a, both or one of the slits can be used for performing the all and/or respective functions. This is also the case for the other subunits.

The cam barrel only needs to convert rotational movement to forward and/or backward movement, and the construction of the cam barrel for moving the inner barrel forward and backward with respect to the outer barrel is not limited to the arrangement described above. For example, the configurations of the helical guides include grooves, slits, or edges. The helical guides are not limited to being provided on the outer barrel and/or the cam barrel, and may be provided on the inner barrel.

Also, although a rear projector apparatus, and a lens system and lens holder suited to the same have been described above, the lens holder and lens unit that are some of the aspects of the present invention can be applied to all kinds of systems that project images. The present invention is also not limited to a system that projects images and can be applied to an optical apparatus and an optical system that use lenses.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A lens holder comprising:
   an inner barrel for holding at least one lens;
   an outer barrel that is positioned outside the inner barrel and supports the inner barrel so that the inner barrel linearly slides along a central axis thereof across an inner surface of the outer barrel; and
   a cam barrel that rotates in a state where the cam barrel is coaxially disposed between the inner barrel and the outer barrel,
   wherein a driven part is provided on the inner barrel,
   an operating slit is provided on the outer barrel, and
   the cam barrel comprises:
   at least two subunits of the same shape produced by dividing the cam barrel on a plane that includes the central axis, the at least two subunits rotating together to function as the cam barrel but being independent in mechanical and structural term to pull the at least two subunits onto the outer barrel individually;
   an operating part that passes through the operating slit provided on the outer barrel and moves at least one of the subunits to rotate the cam barrel;
   a helical cam mechanism that slides, via the driven part provided on the inner barrel, the inner barrel forward or backward along the central axis when the cam barrel rotates; and
   a locking mechanism for pulling one of the at least two subunits individually to other of the at least two subunits onto the outer barrel to stop rotation of the cam barrel.

2. The lens holder according to claim 1,
   wherein the helical cam mechanism includes a guide that is helically shaped around the central axis and contacts the driven part provided on the inner barrel from in front and behind.

3. The lens holder according to claim 1,
   wherein the outer barrel is equipped with a helically shaped slit that is formed around the central axis,
   the driven part extends outward from the inner barrel, and
   the helical cam mechanism comprises:
   a protruding guided part that moves inside the helically shaped slit; and
   a guide that is arranged in a circumferential direction so as to contact the driven part, which extends outward from the inner barrel, from in front and behind.

4. The lens holder according to claim 3,
   wherein the helically shaped slit also serves as the operating slit and the protruding guided part also serves as the operating part.

5. The lens holder according to claim 3,
   wherein the protruding guided part also serves as the locking mechanism and is capable of locking by a screw member screwed thereinto.

6. The lens holder according to claim 1,
   wherein the operating part also serves as the locking mechanism and is capable of locking by a screw member screwed thereinto.

7. The lens holder according to claim 1,
   wherein the outer barrel and the inner barrel are clamshell-type barrels that are divided into at least two parts on a plane that includes the central axis.

8. The lens holder according to claim 1,
   wherein the driven part is integrally molded with the inner barrel.

9. A lens unit comprising:
   a lens holder according to claim 1; and
   at least one lens held by the inner barrel.

10. An image displaying apparatus comprising:
    a lens unit according to claim 9;
    a light modulator; and
    a screen onto which projecting light from the light modulator is projected.

11. A lens holder comprising:
    an inner barrel for holding at least one lens;
    an outer barrel that is positioned outside the inner barrel and supports the inner barrel so that the inner barrel linearly slides along a central axis thereof across an inner surface of the outer barrel; and
    a cam barrel that rotates in a state where the cam barrel is coaxially disposed between the inner barrel and the outer barrel,
    wherein a driven part is provided on the inner barrel,
    an operating slit is provided on the outer barrel, and
    the cam barrel comprises:
    at least two subunits of the same shape produced by dividing the cam barrel on a plane that includes the central axis;
    an operating part that passes through the operating slit provided on the outer barrel and moves at least one of the subunits to rotate the cam barrel;
    a helical cam mechanism that slides, via the driven part provided on the inner barrel, the inner barrel forward or backward along the central axis when the cam barrel rotates; and
    a locking mechanism for pulling at least one of the subunits onto the outer barrel to stop rotation of the cam barrel, and
    the outer barrel is equipped with a helically shaped slit that is formed around the central axis,
    the driven part extends outward from the inner barrel, and
    the helical cam mechanism comprises:
    a protruding guided part that moves inside the helically shaped slit; and
    a guide that is arranged in a circumferential direction so as to contact the driven part, which extends outward from the inner barrel, from in front and behind.

12. The lens holder according to claim 11,
wherein the helically shaped slit also serves as the operating slit and the protruding guided part also serves as the operating part.

13. The lens holder according to claim 11,
wherein the protruding guided part also serves as the locking mechanism and is capable of locking by a screw member screwed thereinto.

14. The lens holder according to claim 11,
wherein the outer barrel and the inner barrel are clamshell-type barrels that are divided into at least two parts on a plane that includes the central axis.

15. The lens holder according to claim 11,
wherein the driven part is integrally molded with the inner barrel.

16. A lens unit comprising:
a lens holder according to claim 11; and
at least one lens held by the inner barrel.

17. An image displaying apparatus comprising:
a lens unit according to claim 16;
a light modulator; and
a screen onto which projecting light from the light modulator is projected.

* * * * *